United States Patent Office 3,179,669
Patented Apr. 20, 1965

3,179,669
MONOHYDROXY SUBSTITUTED 2,2'-ALKYLI-
DENEBISBENZIMIDAZOLES
Joseph J. Ursprung, Portage, Mich., assignor to The Upjohn Company, Kalamazoo, Mich., a corporation of Delaware
No Drawing. Filed June 15, 1964, Ser. No. 375,322
6 Claims. (Cl. 260—309.2)

This application is a continuation-in-part of application Serial No. 163,032, filed December 29, 1961 (now abandoned).

This invention pertains to novel organic compounds, and is more particularly directed to monohydroxy-substituted 2,2'-alkylidenebisbenzimidazoles, acid addition salts thereof, and alkali metal and ammonium salts thereof.

The novel compounds of the invention are selected from the class consisting of (a) the compound represented by the formula:

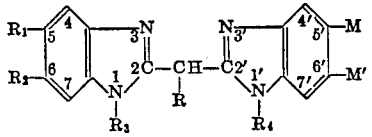

(I)

wherein R, R$_3$, and R$_4$ are selected from the class consisting of hydrogen and alkyl of from 1 to 6 carbon atoms, inclusive, for example, methyl, ethyl, propyl, butyl, amyl, hexyl, and isomeric forms thereof, R$_1$ and R$_2$ are alkyl of from 1 to 3 carbon atoms, inclusive, i.e., methyl, ethyl, propyl, and isopropyl, and one of M and M' is hydroxy, the other of M and M' being hydrogen; (b) acid addition salts thereof; and (c) alkali metal and ammonium salts thereof.

The novel monohydroxy-substituted 2,2'-alkylidenebisbenzimidazoles of this invention exhibit anthelmintic activity, and they can be used for the control of parasitic worms in mammals. Illustratively, the compounds are active against *Nippostrongylus muris* in rats; and they can be used in the control of other Strongylata infections such as *Ancylostoma duodenale*, *Necator americanus*, *A. caninum*, *Strongylus vulgaris*, *Chabertia ovina*, and *Stephanurus dentatus*.

The novel compounds of the invention having the Formula I can be prepared by acid hydrolysis of corresponding monoalkoxy - substituted 2,2' - alkylidenebisbenzimidazoles of the formula

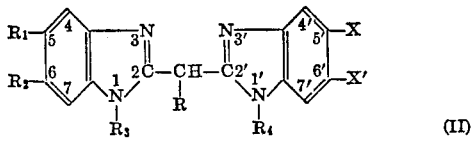

(II)

wherein R, R$_1$, R$_2$, R$_3$, and R$_4$ are as defined above; and one of X and X' is alkoxy, for example, methoxy, ethoxy, propoxy, isopropoxy, hexyloxy, octyloxy, and the like, the other of X and X' being hydrogen. Hydrolysis is conveniently effected with a strong mineral acid, for example, hydrobromic acid and hydriodic acid, or with pyridine hydrochloride, or with a Lewis acid, for example, boron trifluoride, aluminum chloride and aluminum bromide. Illustratively, it has been found that acid hydrolysis is readily effected with commercially available 48% hydrobromic acid. Hydrolysis with a strong acid is accompanied by production of acid addition salts of the invention which usually separate as solids. They are isolated and purified by conventional methods such as filtration, solvent distillation, and recrystallization. The acid addition salts can be readily converted to the free base compounds of Formula I by neutralizing an aqueous solution thereof with a stoichiometric amount of a base, for example, ammonium hydroxide, sodium hydroxide, potassium hydroxide, and the like.

The monoalkoxy-substituted 2,2'-alkylidenebisbenzimidazole intermediates having the Formula II can be prepared in a convenient manner as follows:

(a) A 4,5-dialkyl-1,2-phenylenediamine of the following formula:

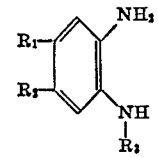

(III)

wherein R$_1$, R$_2$, and R$_3$ are as defined hereinbefore, is condensed with an acid addition salt of a carbalkoxyacetimino alkyl ether, illustratively, a carbalkoxyacetimino alkyl ether hydrohalide, e.g.,

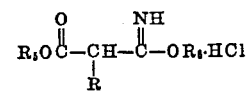

wherein R$_5$ and R$_6$ represent alkyl groups, preferably ethyl, and R is as defined hereinbefore, to form the corresponding alkyl 2 - (5,6 - dialkyl - 2 - benzimidazolyl)-alkanoate according to the following equation:

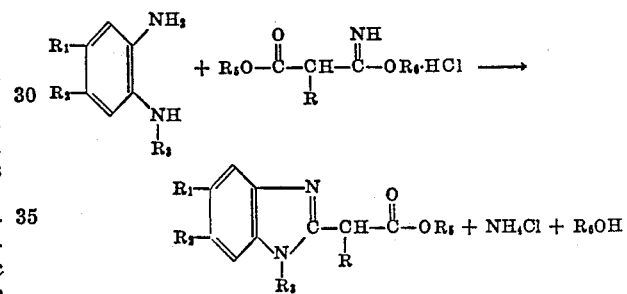

The reaction is carried out advantageously by bringing the reactants together in substantially equimolar proportions in the presence of an inert solvent, illustratively, a lower alkanol such as methanol, ethanol, isopropyl alcohol, and the like. For convenience, it is preferable to carry out the reaction at elevated temperatures such as the boiling point of the inert solvent, but ordinary temperatures can be employed if desired. Generally speaking, the reaction is carried out advantageously at a temperature within the range of about 20° C. to about 150° C. and preferably within the range of about 35° C. to about 105° C.

The desired compound is isolated from the reaction mixture by conventional procedures, for example, by dilution of the reaction mixture with water, followed by basification of the solution and isolation of the precipitate by filtration. The compound so obtained can be purified by conventional procedures, for example, by recrystallization.

(b) The alkyl 2-(5,6-dialkyl-2-benzimidazolyl)-alkanoate so obtained is then condensed with an alkoxy-substituted 1,2-phenylenediamine of the formula:

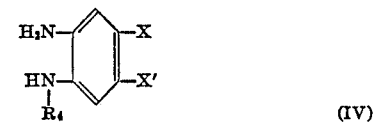

(IV)

wherein R$_4$, X, and X' are as defined hereinbefore, to obtain the compound represented by Formula II, above. Advantageously, the reaction is carried out by heating the reactants together alone or, if desired, in the presence of an inert solvent such as trichlorobenzene, decalin, tetralin, and the like. Preferably, the reaction is carried out in the presence of an inert solvent at a temperature within the range of about 150° C. to about 250° C. and preferably within the range of about 175° C. to about 225° C. Advantageously, the reactants are present in substantially equimolar proportions. Generally speaking, the desired compound having the Formula II separates on cooling the reaction mixture and can be isolated therefrom by filtration. The compound so obtained can be purified by conventional procedures, for example, by recrystallization.

It will be appreciated that the above procedure can be varied by employing the phenylenediamine having the Formula IV in stage (a) and the phenylenediamine having the Formula III in stage (b). That is to say, in a variation of the above process, stage (a) comprises the condensation of a phenylenediamine having the Formula IV with an acid addition salt of a carbalkoxyacetimino alkyl ether to yield the corresponding alkyl 2-(2-benzimidazolyl)-alkanoate. Stage (b) then comprises the reaction of the latter compound with a phenylenediamine having the Formula III to yield the compound having the Formula II.

The acid addition salts of the carbalkoxyacetimino alkyl ether base employed in stage (a) of the process described above are prepared by treating the corresponding alkyl α-cyanoalkanoate

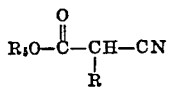

wherein R and $R_5$ are as defined hereinbefore, with the appropriate acid in the presence of the appropriate alkanol, $R_6OH$, wherein $R_6$ is as defined hereinbefore. For example, the hydrochloride of the carbalkoxyacetimino alkyl ether is prepared advantageously by passing anhydrous hydrogen chloride gas into a mixture of the alkyl α-cyanoalkanoate and the alkanol in solution in an inert solvent such as ether. Preferably, the reaction is carried out at a temperature of the order of 0° C. The alkyl α-cyanoalkanoate and alkanol are employed in substantially equimolar proportions and the desired hydrochloride separates from the reaction mixture. Generally speaking, the product so obtained is in a sufficient state of purity to be used without further treatment, but if desired, the compound can be purified by conventional procedures, for example, by recrystallization.

The 4,5-dialkyl - 1,2 - phenylenediamines having the Formula III, above, which are employed as starting materials in the above-described process are known in the art or can be prepared by methods which are well-known in the art. For example, the 4,5-dialkyl-1,2-phenylenediamines of the Formula III wherein $R_3$ is hydrogen, can be prepared by nitration of the corresponding 1,2-dialkylbenzenes to yield the corresponding 1,2-dialkyl-4-nitrobenzenes, reduction of the latter to the corresponding 3,4-dialkylaniline, conversion of the aniline so obtained to its urethane, nitration of the latter followed by hydrolysis to yield the corresponding 4,5-dialkyl-2-nitroaniline, and reduction of the nitro compound so obtained to yield the desired 4,5-dialkyl-1,2-phenylenediamine. The procedure involved in the above series of reactions is preferably that described by Lambooy, J. Am. Chem. Soc. 71, 3756, 1949, for the preparation of 4,5-diethyl-1,2-phenylenediamine.

The 1,2-phenylenediamines having the Formula III, above, wherein $R_3$ represents lower-alkyl, which are employed as starting compounds in the above-described reaction, can be prepared by known methods, e.g., the method described in U.S. Patent 2,400,872, for the preparation of N-methyl- and N-ethyl-1,2-phenylenediamine.

The 4-alkoxy-1,2-phenylenediamines of Formula IV, some of which are known compounds, can be prepared by methods known in the art. For example, 4-methoxy-1,2-phenylenediamine is prepared by catalytic reduction of 3-nitro-4-aminoanisole according to the method described by Ochiai et al., J. Pharm. Soc. Japan 60, 543–550, 1940 (C.A. 35, 1785, 1941). Moreover, 4-ethoxy-1-2-phenylenediamine is prepared by catalytic reduction of 3,4-dinitrophenetole with Raney nickel according to the procedure described by Porai-Koshits et al., Zhur. Obshchei Khim. 19, 1545–52, 1949 (C.A. 44, 1100, 1950). Other 4-alkoxy-1-2-phenylenediamines according to Formula IV can be prepared in the same manner. The N-alkyl-4-alkoxy-1-2-phenylenediamines of Formula IV can be prepared by the methods described by Barber et al., J. Chem. Soc. 1946, 613–616, for the synthesis of N-n-propyl-4-methoxy-1-2-phenylenediamine.

The N-alkyl-5-alkoxy-1-2-phenylenediamines of Formula IV are prepared by nitrating 3-chlorophenol according to the procedure described by De Kiewiet and Stephen, J. Chem. Soc. 1931, 84, to obtain 3-chloro-4-nitrophenol and reacting the thus-obtained 3-chloro-4-nitrophenol with a suitable dialkyl sulfate in the presence of an alkali metal carbonate according to the procedure described by Hodgson and Handley, J. Chem. Soc. 1926, 543, for the preparation of 3-chloro-4-nitroanisole. The 1-alkoxy-3-chloro-4-nitrobenzene thus obtained is then reacted with a suitable alkylamine to produce 5-alkoxy-N-alkyl-2-nitroaniline which is then reduced to the corresponding 5-alkoxy-N-alkyl-1,2-phenylenediamine by conventional procedures.

The acid addition salts of the invention comprise the salts of the compounds having the Formula I, above, with acids. The acid addition salts can be prepared by conventional methods. For example, the compound having the Formula I can be treated with at least a stoichiometric amount of the appropriate acid; and depending upon the nature of the solvent employed, the desired salt will separate spontaneously or can be precipitated by the addition of a solvent in which the salt is insoluble. A pharmacologically acceptable acid addition salt can be prepared using acids such as sulfuric, hydrochloric, hydrobromic, nitric, phosphoric, benzoic, p-toluenesulfonic, salicylic, acetic, propionic, tartaric, citric, succinic acids, and the like. Likewise, the compounds of this invention having Formula I, above, can be reacted with fluosilicic acid in accordance with U.S. Patents 1,915,334 and 2,075,359 for preparing amine fluosilicate mothproofing agents, and in accordance with U.S. Patents 2,425,320 and 2,606,115 in preparing amine thiocyanate-formaldehyde condensation products for use as pickling inhibitors. The acid addition salts of this invention provide a convenient means for refining the free base, and any acid that will form the acid addition salt is suitable.

The alkali metal and ammonium salts of the invention are prepared by reacting the compounds having the Formula I, above, with a stoichiometric amount of a base, for example, sodium hydroxide, ammonium hydroxide, potassium hydroxide, and lithium hydroxide. Advantageously, the reaction is conducted in aqueous medium, and the desired alkali metal or ammonium salt can be isolated by concentrating the medium.

When used in therapy, the novel monohydroxy-substituted 2,2'-alkylidenebisbenzimidazoles of the invention can be formulated as the essential active ingredient, in novel dosage compositions for administration via oral or parenteral routes. Suitably, the compositions comprise the essential active ingredient and a solid or fluid pharmaceutical carrier. Convenient solid pharmaceutical carriers for solid compositions include, e.g., cornstarch, lactose, dicalcium phosphate, terra alba (calcium sulfate), talc, stearic acid, magnesium stearate, gums, and functionally similar materials. Suitable solid compositions include tablets, pills, capsules, granules, powders, wafers, and cachets. Fluid pharmaceutical carriers for fluid compositions advantageously comprise water; oils, for example, cottonseed oil, sesame oil, and peanut oil; and oil-water emulsions. Appropriate fluid compositions include solutions, suspensions, syrups, oil-water emulsions, and the like.

The following examples are illustrative of the process and products of the present invention, but are not to be construed as limiting.

EXAMPLE 1

*Preparation of 5,6-dimethyl-5'-hydroxy-2,2'-methylenebisbenzimidazole and the dihydrobromide and dihydrochloride thereof*

PART A.—2-CARBETHOXYACETIMINO ETHYL ETHER HYDROCHLORIDE

A solution of 113 g. (1 mole) of ethyl cyanoacetate in a mixture of 46 g. (1 mole) of anhydrous ethanol and 3 l. of anhydrous ether was stirred and cooled to 0° C. Anhydrous hydrogen chloride was passed into the cooled solution until the latter was saturated. The mixture was then stirred at 0° C. for a further 3 hrs. The solid which had separated was isolated by filtration, washed thoroughly with ether on the filter, and dried in vacuo. There was thus obtained 179 g. of 2-carbethoxyacetimino ethyl ether hydrochloride in the form of a white solid having a melting point of 111° to 113° C. (dec.).

PART B.—ETHYL 2-(5,6-DIMETHYL-2-BENZIMIDAZOLYL) ACETATE

A mixture of 6.8 g. (0.05 mole) of 4,5-dimethyl-1,2-phenylenediamine (Beilsteins Handbuch der Organischen Chemie, 13, 179, 4th Edition, 1930), and 9.8 g. (0.05 mole) of 2-carbethoxyacetimino ethyl ether hydrochloride (Part A above) in 100 ml. of absolute ethanol was heated under reflux for 1 hr. To the cooled mixture was added 100 ml. of water, and the resulting slurry was made alkaline by the addition of aqueous ammonium hydroxide solution. The solid which had separated was isolated by filtration, washed thoroughly with water, and recrystallized from ethanol. There was thus obtained 8.0 g. of ethyl 2-(5,6-dimethyl-2-benzimidazolyl)acetate in the form of a crystalline solid having a melting point of 177° to 181° C.

PART C.—5,6-DIMETHYL-5'-METHOXY-2,2'-METHYLENEBISBENZIMIDAZOLE AND THE DIHYDROCHLORIDE THEREOF

A mixture of 4.64 g. (0.02 mole) of ethyl 2-(5,6-dimethyl-2-benzimidazolyl)acetate and 2.76 g. (0.02 mole) of 4-methoxy-1,2-phenylenediamine in 25 ml. of 1,2,4-trichlorobenzene was heated with stirring in an oil bath to 180° C. The reaction began at this temperature and the ethanol and water produced by the reaction were collected in a trap. As the reaction proceeded, the temperature was gradually increased to 210° C., and after 30 min. at this temperature, the theoretical amount of ethanol and water had accumulated in the trap.

After the reaction mixture was cooled and diluted with benzene, a tan solid separated. The solid was recovered on a filter, washed with benzene and dried. After suspending it in ethanol and adding an excess of concentrated hydrochloric acid, the slurry thus obtained was diluted with ether, filtered, and further washed with ether. 5,6-dimethyl-5'-methoxy-2,2' - methylenebisbenzimidazole was obtained by dissolving the material in water and adding an excess of ammonia. The free base was suspended in ethanol, an excess of concentrated hydrochloric acid was added, and 5.2 g. of 5,6-dimethyl-5'-methoxy-2,2'-methylenebisbenzimidazole dihydrochloride was obtained as colorless needles having a melting point of 295° to 300° C. (dec.).

*Analysis.*—Calc'd for $C_{18}H_{20}Cl_2N_4O$: C, 57.00; H, 5.32; N, 14.77; Cl, 18.70. Found: C, 56.85; H, 5.18; N, 14.67; Cl, 18.70.

PART D.—5,6-DIMETHYL-5'-HYDROXY-2,2'-METHYLENEBISBENZIMIDAZOLE AND THE DIHYDROBROMIDE AND DIHYDROCHLORIDE THEREOF

A solution of 2.0 g. (6.5 millimoles) of 5,6-dimethyl-5'-methoxy-2,2'-methylenebisbenzimidazole in 50 ml. of 48% aqueous hydrobromic acid was heated under reflux for 1 hr. Colorless needles formed, and after cooling the mixture and filtering, 2.1 g. of 5,6-dimethyl-5'-hydroxy-2,2' - methylenebisbenzimidazole dihydrobromide having a melting point of 350° C. (dec.) was recovered. The dihydrobromide was dissolved in water, and ammonia was added. The thus-formed 5,6-dimethyl-5'-hydroxy-2,2'-methylenebisbenzimidazole free base separated as a solid. It was recovered on a filter, washed with water, and converted to the dihydrochloride with ethanolic hydrogen chloride. Upon dilution with ether, the 5,6 - dimethyl - 5'-hydroxy-2,2'-methylenebisbenzimidazole dihydrochloride precipitated as a monohydrate. The precipitate was recovered on a filter, washed with ether, and dried. It had a melting point of 320° to 330° C. (dec.)

*Analysis.*—Calc'd for $C_{17}H_{18}Cl_2N_4O \cdot H_2O$: C, 53.27; H, 5.26; N, 14.62; Cl, 18.50; $H_2O$, 4.71. Found: C, 53.26; H, 5.46; N, 14.41; Cl, 18.41; $H_2O$, 5.53.

Characteristic infrared absorption frequencies (cm.$^{-1}$): OH, 3360, 3140; HCl amine salt, 3000–2660, 2500; $H_2O$, 1640; C=N/C=C, 1632, 1570, 1518, 1500; C—O, 1232, 1212; aromatic sub., 847, 817.

Following the same procedure but replacing hydrogen chloride by nitric, sulfuric, phosphoric, benzoic, p-toluenesulfonic, salicylic, acetic, propionic, tartaric, citric, succinic, fluosilicic, picric, oxalic and thiocyanic acid, there were prepared the corresponding 5,6-dimethyl-5'-hydroxy-2,2'-methylenebisbenzimidazole dinitrate, sulfate, phosphate, dibenzoate, di-p-toluene sulfonate, disalicylate, diacetate, dipropionate, tartrate, citrate, succinate, fluosilicate, dipicrate, oxalate, and dithiocyanate, respectively.

EXAMPLE 2

*Preparation of 5,6 - dimethyl-5'-hydroxy-2,2'-methylenebisbenzimidazole and the dihydrobromide and dihydrochloride thereof*

PART A.—5,6 - DIMETHYL-5'-ETHOXY-2,2'-METHYLENEBISBENZIMIDAZOLE AND THE DIHYDROCHLORIDE THEREOF

Following the procedure of Example 1, Part C, but substituting 3.04 g. (0.02 mole) of 4-ethoxy-1,2-phenylenediamine for 4-methoxy-1,2-phenylenediamine, there were prepared 5,6 - dimethyl-5'-ethoxy-2,2'-methylenebisbenzimidazole and the dihydrochloride thereof. The dihydrochloride had a melting point of 305° C. (dec.).

*Analysis.*—Calc'd for $C_{19}H_{22}Cl_2N_4O$: C, 58.02; H, 5.64; N, 14.25; Cl, 18.03. Found: C, 57.94; H, 5.68; N, 14.04; Cl, 17.86.

PART B.—5,6-DIMETHYL-5'-HYDROXY-2,2'-METHYLENEBISBENZIMIDAZOLE AND THE DIHYDROBROMIDE AND DIHYDROCHLORIDE THEREOF

Following the procedure of Example 1, Part D, but substituting 5,6-dimethyl-5'-ethoxy-2,2'-methylenebisbenzimidazole for 5,6 - dimethyl-5'-methoxy-2,2'-methylenebisbenzimidazole, there were prepared 5,6-dimethyl-5'-hydroxy-2,2'-methylenebisbenzimidazole and the dihydrobromide and dihydrochloride thereof.

EXAMPLE 3

*Preparation of 5'-hydroxy-1',5,6-trimethyl-2,2'-methylenebisbenzimidazole and the dihydrobromide and dihydrochloride thereof*

PART A.—4'-METHOXY-2'-NITRO-p-TOLUENESULFONANILIDE

A solution of 33.6 g. (0.2 mole) of 4-methoxy-2-nitroaniline in 150 ml. of pyridine was mixed with 40.0 g. of p-toluenesulfonyl chloride and the mixture was heated on a steam bath for about 4 hrs. After cooling, the reaction mixture was poured into ice-water. An oil separated which quickly solidified. The solid was recovered on a filter, washed thoroughly with water, and recrystallized from ethanol to give 62.0 g. of 4'-methoxy-2'-nitro-p-toluene-sulfonanilide as a yellow solid having a melting point of 90° to 95° C.

PART B.—N'-METHYL-4'-METHOXY-2'-NITRO-p-TOLUENESULFONANILIDE

A solution of 20.0 g. (0.62 mole) of 4'-methoxy-2'-nitro-p-toluenesulfonanilide in 100 ml. of dimethylformamide was mixed with 4.5 g. of sodium methoxide. The mixture was swirled for a few minutes and 10.0 g. (0.07 mole) of methyl iodide was then added. The reaction mixture was heated on a steam bath for 1 hr., a further 5.0 g. (0.035 mole) of methyl iodide was added and heating was continued for an additional ½ hr. After standing at room temperature overnight, the mixture was diluted with water. An oil separated which quickly solidified. The solid was recovered on a filter, washed with water, and recrystallized from ethanol, to give 15.5 g. of N'-methyl-4'-methoxy-2'-nitro-p-toluenesulfonanilide having a melting point of 117° to 120° C.

*Analysis.*—Calc'd for $C_{15}H_{16}N_2O_5S$: C, 53.56; H, 4.79; N, 8.33; S, 9.53. Found: C, 53.69; H, 4.54; N, 7.85; S, 9.59.

PART C.—N-METHYL-4-METHOXY-2-NITROANILINE

A solution consisting of 5.0 g. of N'-methyl-4'-methoxy-2'-nitro-p-toluenesulfonanilide, 6 ml. of concentrated sulfuric acid and 1 ml. of water was heated on a steam bath in an atmosphere of nitrogen for 1½ hrs. After cooling, the reaction mixture was poured into ice-water and a red solid separated. The solid was recovered on a filter, and recrystallized from ethanol to give 2.2 g. of N-methyl-4-methoxy-2-nitroaniline as a bright red solid having a melting point of 96° to 98° C.

*Analysis.*—Calc'd for $C_8H_{10}N_2O_3$: C, 52.74; H, 5.53; N, 15.38. Found: C, 52.92; H, 5.77; N, 15.18.

PART D.—N-METHYL-4-METHOXY-1,2-PHENYLENEDIAMINE

A solution of 6.45 g. of N-methyl-4-methoxy-2-nitroaniline in ethanol was hydrogenated in the presence of platinum oxide catalyst at room temperature until the uptake of hydrogen had ceased (about ½ hr.) The catalyst was removed by filtration, and the ethanolic solution was evaporated to dryness under reduced pressure to obtain N-methyl-4-methoxy-1,2-phenylenediamine.

PART E.—5'-METHOXY-1',5,6-TRIMETHYL-2,2-METHYLENEBISBENZIMIDAZOLE AND THE DIHYDROCHLORIDE THEREOF

Following the procedure of Example 1, Part C, but substituting N-methyl-4-methoxy-1,2 - phenylenediamine for 4-methoxy-1,2-phenylenediamine, there were prepared 5'-methoxy-1',5,6-trimethyl-2,2' - methylenebisbenzimidazole and the dihydrochloride thereof.

PART F.—5'-HYDROXY-1',5,6-TRIMETHYL-2,2'-METHYLENEBISBENZIMIDAZOLE AND THE DIHYDROBROMIDE AND DIHYDROCHLORIDE THEREOF

Following the procedure of Example 1, Part D, but substituting 5'-methoxy-1',5,6-trimethyl-2,2' - methylenebisbenzimidazole for 5,6-dimethyl-5'-methoxy-2,2'-methylenebisbenzimidazole, there were prepared 5'-hydroxy-1',5,6 - trimethyl - 2,2'-methylenebisbenzimidazole and the dihydrobromide and dihydrochloride thereof.

EXAMPLE 4

*Preparation of 5,6-dimethyl - 1' - ethyl - 5' - hydroxy-2,2'-methylenebisbenzimidazole and the dihydrobromide and dihydrochloride thereof*

PART A.—N'-ETHYL-4'-METHOXY-2'-NITRO-p-TOLUENEFULFONANILIDE

Following the procedure of Example 3, Part B, but substituting ethyl iodide for methyl iodide, there was prepared N'-ethyl-4'-methoxy-2'-nitro-p-toluenesulfonanilide as nearly white needles having a melting point of 113° to 115° C.

*Analysis.*—Calc'd for $C_{16}H_{18}N_2O_5S$: C, 54.84; H, 5.18; N, 8.00; S, 9.15. Found: C, 54.96; H, 5.51; N, 8.14; S, 9.25.

PART B.—N-ETHYL-4-METHOXY-2-NITROANILINE

Following the procedure of Example 3, Part C, but substituting N' - ethyl-4'-methoxy-2'-nitro-p-toluene-sulfonanilide for N'-methyl-4'-methoxy-2'-nitro-p-toluene-sulfonanilide, there was prepared a red solid which on recrystallization from ethanol gave 4.5 g. of N-ethyl-4-methoxy-2-nitroaniline as a blood-red solid having a melting point of 54° to 56° C.

*Analysis.*—Calc'd for $C_9H_{12}N_2O_3$: C, 55.09; H, 6.17; N, 14.28. Found: C, 54.80; H, 5.87; N, 14.42.

PART C.—N-ETHYL-4-METHOXY-1,2-PHENYLENEDIAMINE

Following the procedure of Example 3, Part D, but substituting 4.35 g. of N-ethyl-4-methoxy-2-nitroaniline for N-methyl-4-methoxy-2-nitroaniline, there was prepared N-ethyl-4-methoxy-1,2-phenylenediamine.

PART D.—5,6-DIMETHYL-1'-ETHYL - 5' - METHOXY-2,2'-METHYLENEBISBENZIMIDAZOLE AND THE DIHYDROCHLORIDE THEREOF

Following the procedure of Example 1, Part C, but substituting N-ethyl-4-methoxy-1,2-phenylenediamine for 4-methoxy-1,2-phenylenediamine, there were prepared 5,6-dimethyl-1'-ethyl-5'-methoxy-2,2' - methylenebisbenzimidazole and the dihydrochloride thereof.

PART E.—5,6-DIMETHYL-1'-ETHYL - 5' - HYDROXY-2,2'-METHYLENEBISBENZIMIDAZOLE AND THE DIHYDROBROMIDE AND DIHYDROCHLORIDE THEREOF

Following the procedure of Example 1, Part D, but substituting 5,6-dimethyl-1'-ethyl-5'-methoxy-2,2'-methylenebisbenzimidazole for 5,6 - dimethyl-5'-methoxy-2,2'-methylenebisbenzimidazole, there were prepared 5,6-dimethyl - 1' - ethyl-5'-hydroxy-2,2'-methylenebisbenzimidazole and the dihydrobromide and dihydrochloride thereof.

EXAMPLE 5

*Preparation of 5,6 - dimethyl - 1'-n-hexyl-5'-hydroxy-2,2'-methylenebisbenzimidazole and the dihydrobromide and dihydrochloride thereof*

PART A.—5,6 - DIMETHYL-1'-n-HEXYL-5'-METHOXY-2,2'-METHYLENEBISBENZIMIDAZOLE AND THE DIHYDROCHLORIDE THEREOF

Following the procedure of Example 1, Part C, but substituting N-n-hexyl-4-methoxy-1,2-phenylenediamine for 4-methoxy-1,2-phenylenediamine, there were prepared 5,6-dimethyl-1'-n-hexyl-5'-methoxy - 2,2' - methylenebisbenzimidazole and the dihydrochloride thereof.

PART B.—5,6 - DIMETHYL-1'-n-HEXYL-5'-HYDROXY-2,2'-METHYLENEBISBENZIMIDAZOLE AND THE DIHYDROBROMIDE AND DIHYDROCHLORIDE THEREOF

Following the procedure of Example 1, Part D, but substituting 5,6-dimethyl-1'-n-hexyl-5' - methoxy - 2,2'-methylenebisbenzimidazole for 5,6-dimethyl-5'-methoxy-2,2'-methylenebisbenzimidazole, there were prepared 5,6 - dimethyl - 1'-n-hexyl-5'-hydroxy-2,2'-methylenebisbenzimidazole and the dihydrobromide and the dihydrochloride thereof.

EXAMPLE 6

*Preparation of 5,6 - diethyl-5'-hydroxy-2,2'-methylenebisbenzimidazole and the dihydrobromide and the dihydrochloride thereof*

PART A.—5,6 - DIETHYL-5'-METHOXY-2,2'-METHYLENEBISBENZIMIDAZOLE AND THE DIHYDROCHLORIDE THEREOF

Following the procedure of Example 1, Part B, but substituting 4,5 - diethyl-1,2 - phenylenediamine (Lambooy, supra) for 4,5-dimethyl-1,2-phenylenediamine, there was prepared ethyl 2 - (5,6-diethyl-2-benzimidazolyl)acetate which was then reacted with 4-methoxy-1,2-phenylenediamine according to the procedure of Example 1, Part C, to obtain 5,6 - diethyl-5'-methoxy-2,2'-methylenebisbenzimidazole and the dihydrochloride thereof.

PART B.—5,6-DIETHYL-5'-HYDROXY-2,2'-METHYLENE-
BISBENZIMIDAZOLE AND THE DIHYDROBROMIDE
AND DIHYDROCHLORIDE THEREOF

Following the procedure of Example 1, Part D, but substituting 5,6 - diethyl - 5'-methoxy-2,2'-methylenebisbenzimidazole for 5,6-dimethyl-5'-methoxy-2,2'-methylenebisbenzimidazole, there were prepared 5,6-diethyl-5'-hydroxy-2,2'-methylenebisbenzimidazole and the dihydrobromide and dihydrochloride thereof.

EXAMPLE 7

*Preparation of 5,6-dimethyl-5'-hydroxy-2,2'-propylidenebisbenzimidazole and the dihydrobromide and the dihydrochloride thereof*

PART A.—5,6-DIMETHYL-5'-METHOXY - 2,2' - PROPYLIDENEBISBENZIMIDAZOLE AND THE DIHYDROCHLORIDE THEREOF

Following the procedure of Example 1, Part A, but substituting ethyl α-cyanobutyrate (Alexander et al., J. Am. Chem. Soc. 66, 886, 1944) for ethyl cyanoacetate, there was prepared 2-carbethoxybutyrimino ethyl ether hydrochloride. Following the procedure of Example 1, Part B, but substituting 2-carbethoxybutyrimino ethyl ether hydrochloride for 2-carbethoxyacetimino ethyl ether hydrochloride, there was prepared ethyl 2-(5,6-dimethyl-2-benzimidazolyl)butyrate. The latter compound was then condensed with 4-methoxy-1,2-phenylenediamine using the procedure described in Example 1, Part C, to obtain 5,6 - dimethyl - 5' - methoxy-2,2'-propylidenebisbenzimidazole and the dihydrochloride thereof.

PART B.—5,6-DIMETHYL - 5' - HYDROXY-2,2'-PROPYLIDENEBISBENZIMIDAZOLE AND THE DIHYDROBROMIDE AND DIHYDROCHLORIDE THEREOF

Following the procedure of Example 1, Part D, but substituting 5,6-dimethyl-5'-methoxy-2,2'-propylidenebisbenzimidazole for 5,6-dimethyl-5'-methoxy-2,2'-methylenebisbenzimidazole, there were prepared 5,6-dimethyl-5'-hydroxy-2,2'-propylidenebisbenzimidazole and the dihydrobromide and dihydrochloride thereof.

EXAMPLE 8

*Preparation of 5,6-dimethyl-5'-hydroxy-2,2'-ethylidenebisbenzimidazole and the dihydrobromide and dihydrochloride thereof*

PART A.—5,6-DIMETHYL - 5' - METHOXY-2,2'-ETHYLIDENEBISBENZIMIDAZOLE AND THE DIHYDROCHLORIDE THEREOF

Following the procedure of Example 7, Part A, but substituting ethyl α-cyanopropionate for ethyl α-cyanobutyrate, there were prepared 5,6-dimethyl-5'-methoxy-2,2'-ethylidenebisbenzimidazole and the dihydrochloride thereof.

PART B.—5,6 - DIMETHYL-5'-HYDROXY - 2,2' - ETHYLIDENEBISBENZIMIDAZOLE AND THE DIHYDROBROMIDE AND DIHYDROCHLORIDE THEREOF

Following the procedure of Example 1, Part D, but substituting 5,6 - dimethyl-5'-methoxy-2,2'-ethylidenebisbenzimidazole for 5,6-dimethyl-5'-methoxy-2,2'-methylenebisbenzimidazole, there were prepared 5,6-dimethyl-5'-hydroxy-2,2'-ethylidenebisbenzimidazole and the dihydrobromide and dihydrochloride thereof.

EXAMPLE 9

*Preparation of 5,6 - dimethyl - 5' - hydroxy-2,2'-(2,4-dimethylpentylidene)bisbenzimidazole and the dihydrobromide and dihydrochloride thereof*

PART A.—5,6-DIMETHYL - 5' - METHOXY - 2,2' - (2,4-DIMETHYLPENTYLIDENE)BISBENZIMIDAZOLE AND THE DIHYDROCHLORIDE THEREOF

Following the procedure of Example 7, Part A, but substituting ethyl α-cyano-β,δ-dimethylcaproate (Alexander et al., supra) for ethyl α-cyanobutyrate, there were prepared 5,6 - dimethyl - 5'-methoxy-2,2'-(2,4-dimethylpentylidene)bisbenzimidazole and the dihydrochloride thereof.

PART B.—5,6-DIMETHYL-5'-HYDROXY-2,2'-(2,4-DIMETHYLPENTYLIDENE)BISBENZIMIDAZOLE AND THE DIHYDROBROMIDE AND DIHYDROCHLORIDE THEREOF

Following the procedure of Example 1, Part D, but substituting 5,6-dimethyl-5'-methoxy-2,2'-(2,4-dimethylpentylidene)bisbenzimidazole for 5,6-dimethyl-5'-methoxy-2,2'-methylenebisbenzimidazole, there were prepared 5,6 - dimethyl-5'-hydroxy-2,2'-(2,4-dimethylpentylidene)-bisbenzimidazole and the dihydrobromide and dihydrochloride thereof.

EXAMPLE 10

*Preparation of 5,6 - dimethyl - 1 - ethyl-5'-hydroxy-2,2'-methylenebisbenzimidazole and the dihydrobromide and dihydrochloride thereof*

PART A.—4',5'-DIMETHYL-2'-NITRO-p-TOLUENESULFONANILIDE SODIUM SALT

To a solution of 16.6 g. of 4,5-dimethyl-2-nitroaniline (Takatori et al., J. Pharm. Soc. Japan 75, 881, 1955; C.A. 50, 4920i, 1956) in 50 ml. of pyridine was added 19.0 g. of p-toluenesulfonyl chloride. The mixture was heated on a steam bath for 1 hr., cooled, and poured into ice-water. The resulting yellow solid was recovered by filtration, washed with water, and dried. The dried solid was dissolved in hot ethanol, and to this solution was added a methanol solution of sodium methoxide. By filtering this mixture there was obtained 14.0 g. of 4',5'-dimethyl-2'-nitro-p-toluene-sulfonanilide sodium salt as a bright yellow solid having a melting point of 310° to 315° C. (dec.)

PART B.—4',5'-DIMETHYL-N'-ETHYL-2'-NITRO-p-TOLUENESULFONANILIDE

A solution of 15 g. (0.044 mole) of 4',5'-dimethyl-2'-nitro-p-toluenesulfonanilide sodium salt (Part A) and 8.0 g. (0.051 mole) of ethyl iodide in 75 ml. of dimethylformamide was heated on a steam bath for two hrs., cooled, and treated with an approximately equal volume of water. An oil separated which slowly solidified. The solid was recovered on a filter, and dissolved in hot ethanol. Upon cooling 12 g. of 4',5'-dimethyl-N'-ethyl-2'-nitro-p-toluenesulfonanilide having a melting point of 130° to 132° C. was obtained.

*Analysis.*—Calc'd for $C_{17}H_{20}N_2O_4S$: C, 58.60; H, 5.79; N, 8.04. Found: C, 58.52; H, 5.72; N, 8.31.

PART C.—4,5-DIMETHYL-N-ETHYL-2-NITROANILINE

A solution of 12.0 g. (0.034 mole) of 4',5'-dimethyl-N'-ethyl-2'-nitro-p-toluenesulfonanilide (Part B) in a mixture of 15 ml. of concentrated sulfuric acid and 3 ml. of water was heated on a steam bath for 3.5 hrs. The reaction mixture was cooled and poured into ice-water. An orange solid separated which was recovered on a filter and dissolved in hot ethanol. On cooling, there was obtained 6.5 g. of 4,5-dimethyl-N-ethyl-2-nitroaniline as an orange solid having a melting point of 71° to 74° C.

*Analysis.*—Calc'd for $C_{10}H_{14}N_2O_2$,: C, 61.83; H, 7.27; N, 14.43. Found: C, 61.47; H, 6.74; N, 14.53.

PART D.—4,5-DIMETHYL-N-ETHYL-1,2-PHENYLENEDIAMINE DIHYDROCHLORIDE AND FREE BASE

A suspension of 6.5 g. (0.033 mole) of 4,5-dimethyl-N-ethyl-2-nitroaniline (Part C) in 50 ml. of ethanol acidified with 3 ml. of concentrated hyrochloric acid was hydrogenated in the presence of platinum oxide catalyst until the theoretical amount of hydrogen had been absorbed. The suspension was filtered to remove the catalyst, and the solvent was removed under reduced pressure. The residue thus obtained was dissolved in hot ethanol and poured into ether with vigorous stirring. An oil separated and slowly solidified. The solid was recovered on a filter and dried. There was thus obtained 7.6 g. of 4,5-dimethyl-N-ethyl-1,2-phenylenadiamine dihydrochloride having a melting point of 135° to 138° C.

The free base was obtained by neutralizing the hydrochloride with aqueous sodium hydroxide solution in the conventional manner.

PART E.—5,6-DIMETHYL-1-ETHYL - 5' - METHOXY-2,2'-METHYLENEBISBENZIMIDAZOLE AND THE DIHYDROCHLORIDE THEREOF

Following the procedure of Example 1, Part B, but substituting 4,5 - dimethyl-N-ethyl-1,2-phenylenediamine for 4,5-dimethyl-1,2-phenylenediamine, there was prepared ethyl 2-(5,6-dimethyl-1-ethyl-2-benzimidazolyl) acetate which in turn was reacted with 4-methoxy-1,2-phenylenediamine, according to the procedure of Example 1, Part C, to obtain 5,6-dimethyl-1-ethyl-5'-methoxy-2,2'-methylenebisbenzimidazole and the dihydrochloride thereof.

PART F.—5,6-DIMETHYL-1-ETHYL - 5' - HYDROXY-2,2'-METHYLENEBISBENZIMIDAZOLE AND THE DIHYDROBROMIDE AND DIHYDROCHLORIDE THEREOF

Following the procedure of Example 1, Part D, but substituting 5,6-dimethyl-1-ethyl-5'-methoxy-2,2'-methylenebisbenzimidazole for 5,6 - dimethyl - 5' - methoxy - 2,2' - methylenebisbenzimidazole, there were prepared 5,6-dimethyl - 1 - ethyl - 5' - hydroxy - 2,2' - methylenebisbenzimidazole and the dihydrobromide and dihydrochloride thereof.

EXAMPLE 11

*Preparation of 5,6-dimethyl-5'-hydroxy-1'-n-propyl-2,2'-methylenebisbenzimidazole and the dihydrobromide and dihydrochloride thereof*

PART A.—5,6-DIMETHYL-5'-METHOXY-1'-n-PROPYL-2,2'-METHYLENEBISBENZIMIDAZOLE AND THE DIHYDROCHLORIDE THEREOF

Following the procedure of Example 1, Part C, but substituting 4-methoxy-N-n-propyl-1,2-phenylenediamine for 4-methoxy-1,2-phenylenediamine, there were prepared 5,6 - dimethyl - 5'-methoxy - 1' - n - propyl - 2,2' - methylenebisbenzimidazole and the dihydrochloride thereof.

PART B.—5,6-DIMETHYL-5'-HYDROXY-1'-n-PROPYL-2,2'-METHYLENEBISBENZIMIDAZOLE AND THE DIHYDROBROMIDE AND DIHYDROCHLORIDE THEREOF

Following the procedure of Example 1, Part D, but substituting 5,6 - dimethyl-5'-methoxy-1'-n-propyl - 2,2'-methylenbisbenzimidazole for 5,6-dimethyl-5'-methoxy-2,2'-methylenebisbenzimidazole, there were prepared 5,6-dimethyl - 5' - hydroxy - 1' - n - propyl - 2,2' - methylenebisbenzimidazole and the dihydrobromide and dihydrochloride thereof.

EXAMPLE 12

*Preparation of 6'-hydroxy-1',5,6-trimethyl-2,2'-methylenebisbenzimidazole and the dihydrobromide and dihydrochloride thereof*

PART A.—6'-METHOXY-1',5,6-TRIMETHYL-2,2'-METHYLENEBISBENZIMIDAZOLE AND THE DIHYDROCHLORIDE THEREOF

Following the procedure of Example 1, Part C, but substituting N-methyl-5-methoxy-1,2-phenylenediamine for 4-methoxy-1,2-phenylenediamine, there were prepared 6' - methoxy - 1',5,6 - trimethyl - 2,2' - methylenebisbenzimidazole and the dihydrochloride thereof.

PART B.—6'-HYDROXY-1',5,6-TRIMETHYL-2,2'-METHYLENEBISBENZIMIDAZOLE AND THE DIHYDROBROMIDE AND DIHYDROCHLORIDE THEREOF

Following the procedure of Example 1, Part D, but substituting 6' - methoxy-1',5,6-trimethyl-2,2'-methylenebisbenzimidazole for 5,6-dimethyl-5'-methoxy-2,2'-methylenebisbenzimidazole, there were prepared 6'-hydroxy-1',5,6-trimethyl-2,2'-methylenebisbenzimidazole and the dihydrobromide and dihydrochloride thereof.

EXAMPLE 13

*Preparation of the sodium salt of 5,6-dimethyl-5'-hydroxy-2,2'-methylenebisbenzimidazole*

To a stirred solution of 0.4 g. (0.01 mole) of sodium hydroxide in 50 ml. of water was added 2.92 g. (0.01 mole) of 5,6-dimethyl-5'-hydroxy-2,2'-methylenebisbenzimidazole. The resulting clear solution was evaporated to dryness under reduced pressure to obtain the sodium salt of 5,6 - dimethyl - 5'-hydroxy-2,2'-methylenebisbenzimidazole.

I claim:

1. Compound selected from the group consisting of (a) the compound of the formula

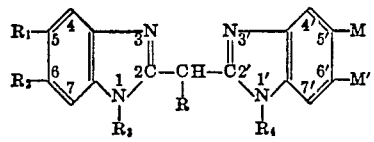

wherein R, R$_3$, and R$_4$ are selected from the group consisting of hydrogen and alkyl of from 1 to 6 carbon atoms, inclusive; R$_1$ and R$_2$ are alkyl of from 1 to 3 carbon atoms, inclusive; and one of M and M' is hydroxy, the other being hydrogen, (b) acid addition salts thereof, and (c) alkali metal and ammonium salts thereof.

2. 5,6 - dialkyl - 5'-hydroxy-2,2'-alkylidenebisbenzimidazole wherein alkyl is of from 1 to 3 carbon atoms, inclusive; and alkylidene is of from 1 to 6 carbon atoms, inclusive.

3. 5,6 - dimethyl-5'-hydroxy-2,2'-methylenebisbenzimidazole.

4. Acid addition salt of 5,6-dialkyl-5'-hydroxy-2,2'-alkylidenebisbenzimidazole wherein alkyl is of from 1 to 3 carbon atoms, inclusive; and alkylidene is of from 1 to 6 carbon atoms, inclusive.

5. 5,6 - dimethyl - 5'hydroxy-2,2'-methylenebisbenzimidazole dihydrochloride.

6. 5,6 - dimethyl - 5'-hydroxy-2,2'-methylenebisbenzimidazole dihydrobromide.

References Cited by the Examiner

UNITED STATES PATENTS

| | | | |
|---|---|---|---|
| 2,969,372 | 1/61 | Braun et al. | 260—310 |
| 3,004,982 | 10/61 | Hoffmann et al. | 260—309.2 |

OTHER REFERENCES

Lane et al.: J. Chem. Soc. (London), 1956, pp. 569–73.

Wang et al.: J. Amer. Chem. Soc., vol. 79, pp. 5706–11 (1957).

Wang: Synthesis of Bis Benzimidazoles as Potential Antimetabolites, pp. 2, 13, and 31, Ann Arbor, University Microfilms, 1957.

WALTER A. MODANCE, *Primary Examiner.*

NICHOLAS S. RIZZO, *Examiner.*